United States Patent [19]

Kayano

[11] Patent Number: 5,073,099

[45] Date of Patent: Dec. 17, 1991

[54] HOT PRESS FOR HEAT FORMING A DISC PAD

[75] Inventor: Katsunari Kayano, Saitama, Japan

[73] Assignee: Akebono Brake Industry Co., Ltd., Tokyo, Japan

[21] Appl. No.: 510,223

[22] Filed: Apr. 18, 1990

[30] Foreign Application Priority Data

Apr. 28, 1989 [JP] Japan ................................. 1-107168

[51] Int. Cl.⁵ .......................... B30B 7/00; B30B 15/34
[52] U.S. Cl. ..................................... 425/125; 100/193;
100/221; 100/265; 425/127; 425/346; 425/406;
425/407; 425/411; 425/412
[58] Field of Search ............... 425/117, 125, 127, 128,
425/193, 195, 338, 339, 346, 398, 406, 407, 411,
412; 264/109, 112, 259; 100/221, 227, 265, 268,
193, 194

[56] References Cited

U.S. PATENT DOCUMENTS

| | | | |
|---|---|---|---|
| 3,795,473 | 3/1974 | Holik | 425/126.1 |
| 4,417,867 | 11/1983 | Bauer | 425/406 |
| 4,441,877 | 4/1984 | Pagnoni | 425/338 |
| 4,968,468 | 11/1990 | Leinweber | 425/125 |

FOREIGN PATENT DOCUMENTS

56-92040  7/1981  Japan ................................. 425/416

Primary Examiner—Jay H. Woo
Assistant Examiner—James P. Mackey
Attorney, Agent, or Firm—Finnegan, Henderson, Farabow, Garrett, and Dunner

[57] ABSTRACT

A hot press for heat forming a disc pad including a pair of presses arranged vertically and in opposition to each other, a support for coupling the pair of presses with each other, a base fixed in a vertically intermediate portion of the support, first heat plates interposed between respective rams of the presses and the base through first adiabatic members respectively so as to be movable up and down vertically together with the rams of the respective presses, second heat plates provided on opposite sides of the base through second adiabatic members respectively, molds respectively inserted between one pair of the first and second heat plates in opposition to each other and the other pair of the first and second heat plates in opposition to each other, each of the molds including a lower mold, and an upper mold fitting into the intermediate mold in which friction material is put, and springs for keeping a predetermined distance to between the springs and the intermediate molds.

21 Claims, 2 Drawing Sheets

HOT PRESS FOR HEAT FORMING A DISC PAD

BACKGROUND OF THE INVENTION

1. Field of the Invention

The present invention relates to a hot press for heat forming a disc pad for a disc brake.

2. Related Art

A conventional hot press for heat forming a disc pad for a disc brake forms a friction material for a disc pad and fixes the friction material integrally onto a back plate. According to the conventional hot press, a lot of presses are arranged on a flat floor to produce disc pads through heat forming press.

In such a conventional hot press for heat forming a disc pad, since a lot of presses are arranged on the flat floor, it has been necessary to provide a large floor area for the arrangement of the presses, and it has also been necessary to provide a supply means separately belonging to individual one of the presses for supplying a mold to the press and extracting the mold from the press after heat forming process, resulting in high manufacturing cost.

Further, in order to prevent an intermediate mold mounted on a lower mold from floating to thereby prevent burr from occurring, it has been necessary to additionally provide an oil pressure cylinder means, resulting that the structure is complicated.

SUMMARY OF THE INVENTION

It is therefore an object of the present invention to solve the foregoing problems accompanying the conventional hot press. That is, an object of the present invention is to provide a hot press for heat forming a disc pad for a disc brake small in size and simple in structure.

It is another object of the invention to provide a hot press capable of preventing burr from occurring.

It is still another object of the invention to provide a hot press extremely improving the capability of producing disc pads.

It is still another object of the invention to provide a hot press capable of shortening the time required to heat molds at the time of replacing molds by new molds if the new molds are heated in advance.

It is still another object of the invention to provide a hot press in which a mold supplying/extracting operation can be made easy without damaging heat plates or without receiving exceeding heat from heat plates.

In order to achieve the above and other objects, according to the present invention, a hot press for heat forming a disc pad comprises: a pair of presses arranged vertically and in opposition to each other; a support for coupling the pair of presses with each other; a base fixed in a vertically intermediate portion of the support; first heat plates interposed between respective rams of the presses and the base through first adiabatic members respectively so as to be movable up and down vertically together with the rams of the respective presses; second heat plates provided on opposite sides of the base through second adiabatic members respectively; and molds respectively inserted between one pair of the first and second heat plates in opposition to each other and the other pair of the first and second heat plates in opposition to each other; each of the molds including a lower mold, an intermediate mold mounted on a back plate mounted on the lower mold, and an upper mold fitting into the intermediate mold in which friction material is put; and springs for keeping a predetermined distance to between the springs and the intermediate molds so as to be in non-contact with the intermediate molds when the rams come away from the base, and for elastically urging the intermediate molds against back plates before the first heat plate in an upper position and the second heat plate in a lower position comes into contact with the upper molds respectively when the rams approach the base.

Preferably, bolsters may be interposed between the rams and the first adiabatic members respectively.

Further, preferably, support members may be provided for supporting the lower molds so as to form predetermined distances between lower and upper molds and the first and second heat plates corresponding to the lower and upper molds when the rams come away from the base, and for filling up the predetermined distances and for releasing the lower molds from being supported by the support members when the rams approach the base. Preferably, the molds may be heated in advance.

First, the presses are in an unclamped state. In this state, the molds each including the preformed friction material and the back plate are supplied into between the first and second heat plates of the lower press and between the first and second plates of the upper press.

Next, the presses are actuated to move forward so as to make the respective rams of the presses approach each other. In the lower-placed press, the first heat plate and the mold begin to move up and the intermediate mold is urged by springs against the back plate, so that the friction material is prevented from leaking as burr out of the gap between the intermediate mold and the back plate. Similarly to this, in the upper press, the ram moves down and the intermediate mold is urged by the springs against the back plate, so that the friction material is prevented from leaking as burr out of the gap between the intermediate mold and the back plate.

Then, the presses are actuated to move further forward. In the lower press, the upper mold urges the second heat plate so that the friction material is compressed, and at the same time, the friction material is heated from its opposite sides by the first heat plate with its lower side heat-insulated by the first adiabatic member and the second heat plate with its upper side heat-insulated by the second adiabatic member to thereby heat form the disc pad constituted by the back plate and the friction material. At this time, the friction material is bonded to the back plate through a thermosetting adhesive agent applied thereto in advance. On the other hand, in the upper press, the ram moves down and the first heat plate urges the upper mold so that the friction material is compressed, and at the same time, the friction material is heated from its opposite sides by the first heat plate with lower side heat-insulated by the first adiabatic member and the second plate with its upper side heat-insulated by the second adiabatic member to thereby heat form the disc pad constituted by the back plate and the friction material. At this time, the friction material is bonded to the back plate through a thermosetting adhesive agent applied thereto in advance. At that time, the respective pressures of the presses are adjusted by increase and decrease in synchronism with each other and given a predetermined pressure cycle so as to make gas inside the friction material escape.

Then, the presses are actuated to move backward so that the rams are separated from each other. In the lower press, the mold is released from being urged by the press. Next, after the intermediate mold is released from being urged by the springs, the mold returns to its initial position. On the other hand, in the upper press, the mold is released from being urged by the press, and, next, after the intermediate mold is released from being urged by the springs, the mold returns to its initial position. Thus, the molds released from the pressed and heated state are extracted.

The disc pads each constituted by the back plate and the friction material and extracted from the respective presses are supplied to the next step, that is, a heating step in an oven.

If the bolsters are interposed between the rams and the first adiabatic members respectively, the pressure of each ram can be uniformly transmitted to the lower-placed or upper-placed first heat plate through the bolsters. Further, the operation to supply and extract the molds can be made easy without damage of the heat plates or without excessive heating by the heat plates if the support members are provided for supporting the lower molds so as to form predetermined distances between lower and upper molds and the first and second heat plates corresponding to the lower and upper molds when the rams come away from the base, and for filling up the predetermined distances and for releasing the lower molds from being supported by the support members when the rams approach the base. Further, if the molds are heated in advance, for example, in the case where various disc pads are produced and the molds are exchanged, it is possible to shorten the time required to make the temperature of the molds rise at the time of heat forming.

Other features and advantages of the present invention will be apparent from the following description taken in connection with the accompanying drawings.

DETAILED DESCRIPTION OF THE PREFERRED EMBODIMENT

An embodiment of the present invention will now be described with reference to accompanying drawings.

Figure 1:
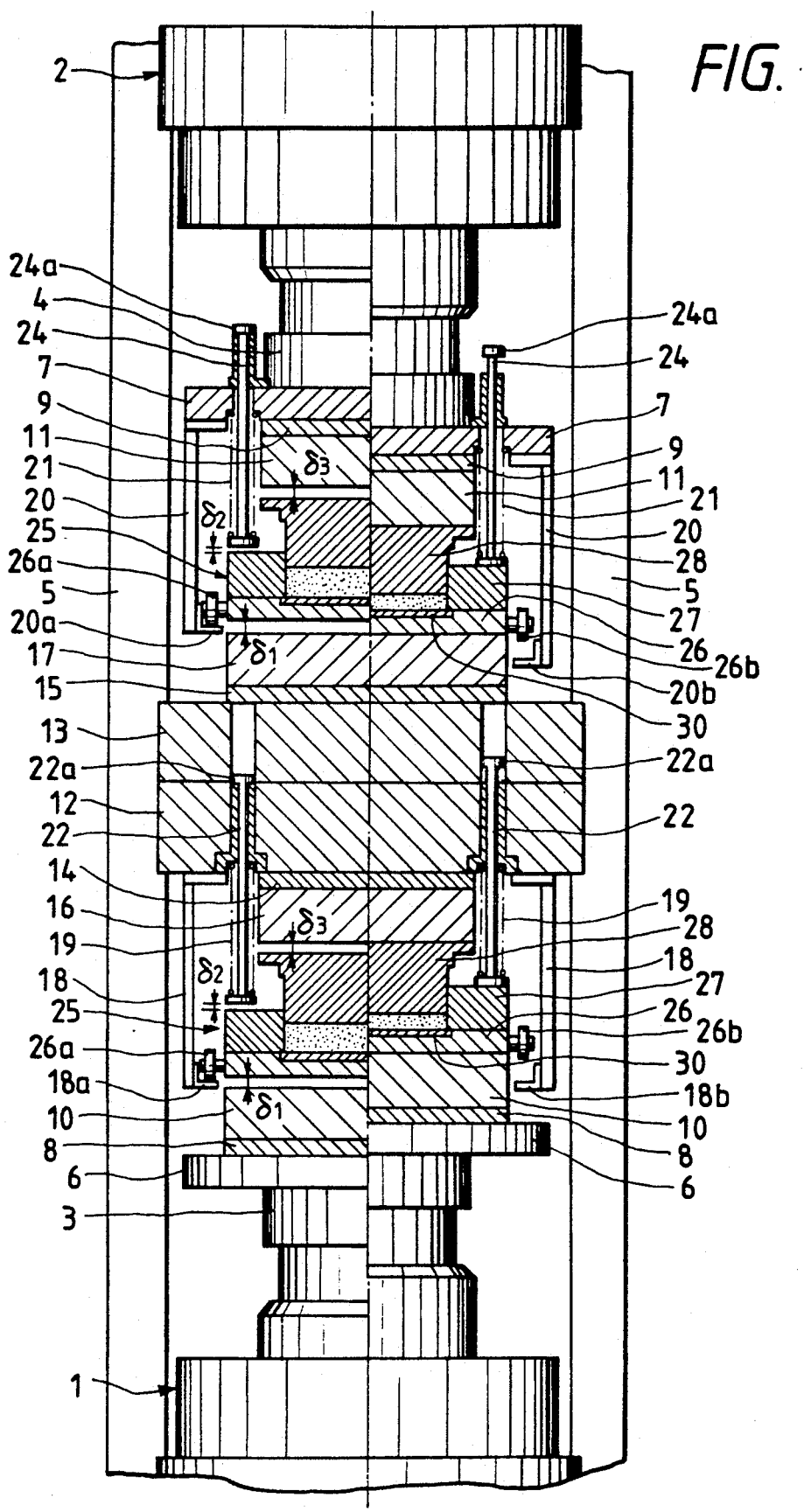
FIG. 1 is a sectional view illustrating an embodiment of the hot press for heat forming a disc pad according to the present invention.
Figure 2:
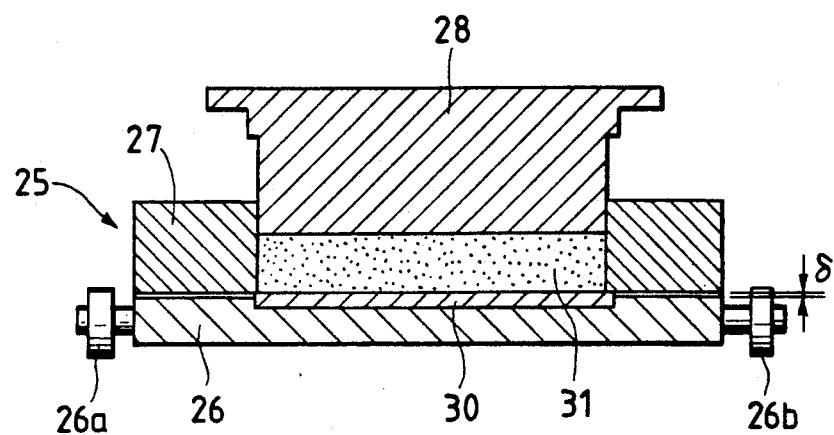
FIG. 2 is a sectional view illustrating only the mold of FIG. 1.

FIGS. 1 and 2 shows an embodiment of the present invention. In FIG. 1, a pair of presses 1 and 2 are vertically arranged in opposition to each other so that the axes of rams 3 and 4 are coincident with each other. That is, one press 1 is disposed on a not-shown floor so that the ram 3 thereof may be projected upwards in press working. The other press 2 is connected and supported with the press 1 by a support 5 so that the ram 4 thereof may be projected downwards in press working. At the top ends of the respective rams 3 and 4, bolsters 6 and 7 are disposed so as to be movable together with the respective rams 3 and 4. First heat plates 10 and 11 are provided in these bolsters 6 and 7 through first adiabatic members 8 and 9 respectively.

A pair of bases 12 and 13 are fixed in an intermediate portion of the support 5, and second heat plates 16 and 17 are disposed on the front sides of the respective bases 12 and 13 through second adiabatic members 14 and 15 respectively. The lower-positioned pairs of first and second heat plates 10 and 16 are opposite to each other, and the upper-positioned pair of first and second heat plates 11 and 17 are opposite to each other. Each of the heat plates 10, 11, 16 and 17 are heated to about 130 to 200° C. by means of an electric heater.

Molds 25 having the same configuration are interposed between the lower-positioned pair of first and second heat plates 10 and 16 and between the upper-positioned pair of first and second heat plates 11 and 17, respectively. As shown in FIG. 2, each mold 25 is constituted by a lower mold 26, an intermediate mold 27 with its lower inner circumferential edge mounted on a back plate 30 which is mounted on the lower mold 26, and an upper mold 28 fitted into the intermediate mold 27. The lower mold 26 is provided, at its opposite sides, with wheels 26a and 26b. The mold 25 is assembled in a manner so that the intermediate mold 27 is mounted on the back plate 30 which is mounted on the lower mold 26, a previously formed friction material 31 is put in the intermediate mold 27, and the upper mold 28 fitted into the intermediate mold 27 is put on the friction material 31. In this state, a little gap δ is formed between the lower and intermediate molds 26 and 27.

In the lower-placed press 1, support members 18 and springs 19 are provided on the base 12. The support members 18 are provided vertically at the four corners of the base 12 respectively. A pair of inward-bent support rail 18a and 18b are provided between the lower end portions of the support members 18 in pair at the left side and between the lower end portions of the support members 18 in pair at the right side respectively in the drawing. When the ram 3 comes down and gets into an unclamped state as shown in the left half of FIG. 1 so that the distance between the heat plates 10 and 16 becomes large, the inward-bent support rails 18a and 18b support the respective wheels 26a and 26b of the lower mold 26. In this state, a gap 6 of about 10 mm is formed between the first heat plate 10 and the lower mold 26 so as to prevent the first heat plate 10 and the lower mold 26 from contacting with each other. At the same time, another gap $\delta_3$ of almost the same size as the gap $\delta_1$ is formed between the second plate 16 and the upper mold 28 before press forming.

The springs 19 are provided vertically at the four corners of the base 12 respectively so that the springs 19 are compressed and interposed between the base 12 and the respective lower ends of support rods 22 penetrating the base 12. Thus, when the ram 3 comes down to enlarge the distance between the heat plates 10 and 16, enlarged-size projection portions 22a of the top ends of the respective support rods 22 are engaged with the upper surface of the base 12 so as to form a predetermined gap $\delta_2$ ($\delta_2 < \delta_1$) between the intermediate mold 27 and the lower ends of the respective support rods 22. On the contrary, when the ram 3 comes up so that the distance between the heat plates 10 and 16 is reduced to thereby get into a clamped state as shown in the right half of FIG. 1, the first heat plate 10 comes into contact with the lower surface of the lower mold 26 so as to release the wheels 26a and 26b from being supported by the support rails 18a and 18b. At the same time, the lower ends of the respective support rods 22 elastically abuts against the upper surface of the intermediate mold 27 so that the intermediate mold 27 is urged by the springs 19 so as to abut against the upper surface of the back plate 30 mounted on the lower mold 26, the upper mold 28 being in contact with the second heat plate 16.

In the upper-placed press 2, on the other hand, the bolster 7 is provided with support members 20 and springs 21. The support members 20 are provided vertically at the four corners of the bolster 7 respectively. A pair of inward-bent support rail 20a and 20b are provided between the lower end portions of the support members 20 in pair at the left side and between the lower end portions of the support members 20 in pair at the right side respectively in the drawing. When the ram 4 comes up and gets into an unclamped state as shown in the left half of FIG. 1 so that the distance between the heat plates 11 and 17 becomes large, the inward-bent support rails 20a and 20b support the respective wheels 26a and 26b of the lower mold 26. In this state, a gap $\delta_1$ of about 10 mm is formed between the second heat plate 17 and the lower mold 26 so as to prevent the second heat plate 17 and the lower mold 26 from contacting with each other. At the same time, another gap $\delta_3$ of almost the same size as the gap $\delta_1$ is formed between the first plate 11 and the upper mold 28 before press forming. The springs 21 are provided vertically at the four corners of the bolster 7 respectively so that the springs 21 are compressed and interposed between the bolster 7 and the respective lower ends of support rods 24 penetrating the bolster 7. Thus, when the ram 4 comes up to enlarge the distance between the heat plates 11 and 17, enlarged-size projection portions 24a of the top ends of the respective support rods 24 are engaged with the upper surface of the bolster 7 in the state that the wheels 26a and 26b of the lower mold 26 are supported by the support rails 20a and 20b respectively so that a predetermined gap $\delta_2$ ($\delta_2 < \delta_1$) is formed between the intermediate mold 27 and the lower ends of the respective support rods 24. On the contrary, when the ram 4 comes down so that the distance between the heat plates 11 and 17 is reduced to thereby get into a clamped state as shown in the right half of FIG. 1, the lower mold 26 comes into contact with the second heat plate 17 so as to release the wheels 26a and 26b from being supported by the support rails 20a and 20b. At the same time, the lower ends of the respective support rods 24 elastically abuts against the upper surface of the intermediate mold 27 so that the intermediate mold 27 is urged by the springs 21 so as to abut against the upper surface of the back plate 30 mounted on the lower mold 26, the upper mold 28 being in contact with the first heat plate 11.

The operation will now be described. First, the respective presses 1 and 2 are in an unclamped state. In this unclamped state, the molds 25 each having the preformed friction material 31 and the back plate 30 are inserted between the first and second heat plates 10 and 16 of the lower press 1 and between the first and second heat plates 11 and 17 of the upper press 2 respectively. At this time, since the respective gaps $\delta_1$, $\delta_2$ and $\delta_3$ are formed, the wheels 26a and 26b of the respective lower molds 26 of the lower and upper presses 1 and 2 can be rolled to move on the respective pairs of support rails 18a and 18b, and 20a and 20b so that the respective lower molds 26 of the lower and upper presses 1 and 2 are prevented from damaging the corresponding first and second heat plates 10 and 17 respectively and prevented from being excessively heated by those first and second heat plates 10 and 17 respectively, and so that the respective upper molds 28 of the lower and upper presses 1 and 2 are prevented from damaging the second and first heat plates 16 and 11 respectively and prevented from being excessively heated by those second and first heat plates 16 and 11 respectively. The supply of the molds 25 in pair is performed automatically by a not-shown supply means for horizontally integrally moving the lower and upper molds 25. At that time, in the case of replacing the molds 25 by other molds 25 which have been cooled, the new molds 25 are preheated to a predetermined temperature (almost the same as the heating temperature by the respective heat plates 10, 11, 16 and 17) by using a not-shown heating means so as to shorten the time taken for the temperature rising of the molds 25 per se.

Next, the presses 1 and 2 are actuated to move forward so as to project the respective rams 3 and 4. In the lower press 1, the mold 25 starts rising to fill the gap $\delta_2$ after the first heat plate 10 has filled the gap $\delta_1$, and the intermediate mold 27 is urged by the support rods 22 having the springs 19 inserted therein so as to abut against the back plate 30. Accordingly, the friction material 31 is prevented from leaking out in the form of burr from the gap between the intermediate mold 27 and the back plate 30. In the same manner, in the upper press 2, the lower mold 26 supported by the rails 20a and 20b comes down as the ram 4 comes down so as to fill the gap $\delta_1$ between the lower mold 26 and the second heat plate 17, and then the respective support rods 24 to which the springs 21 are inserted comes down together with the ram 4 so as to fill the gap $\delta_2$. The intermediate mold 27 is elastically urged by the support rods 24 against the back plate 30. Thus, the friction material 31 can be prevented from partly leaking out in the form of burr from the gap between the intermediate mold 27 and the back plate 30.

Then, the respective presses 1 and 2 are actuated to move further forward. In the lower press 1, the upper mold 28 presses the second heat plate 16 so that the friction material 31 is compressed as shown in the right half of FIG. 1 and heated from the opposite sides by the first heat plate 10 with its lower side heat-insulated by the first adiabatic member 8 and the second heat plate 16 with its the upper side heat-insulated by the second adiabatic member 14 to thereby heat-form a disc pad constituted by the back plate 30 and the friction material 31, and at the same time, the friction material 31 is bonded to the back plate 30 through thermosetting adhesive agent applied over the back plate 30 in advance. On the other hand, in the upper press 2, the first heat plate 11 presses the upper mold 28 as the ram 4 comes down so that the friction material 31 is compressed as shown in the right half of FIG. 1 and heated in its opposite sides by the first heat plate 11 with its upper side heat-insulated by the first adiabatic member 9 and the second heat plate 17 with its lower side heat-insulated by the second adiabatic member 15 so as to heat-form a disc pad, and at the same time, the friction material 31 is bonded to the back plate 30 through thermosetting adhesive agent applied over the back plate 30 in advance. At that time, the respective pressures of the presses 1 and 2 are adjusted to increase/decrease in synchronized with each other, so that a predetermined pressure cycle is given to the respective presses, and at the same time, the gas inside the friction material 31 is made to escape.

Then, the respective presses 1 and 2 are actuated to move backward so as to make the rams 3 and 4 sink. In the lower press 1, the mold 25 is immediately released from being pressed by the press 1, and, next, after the top end projection portions 22a of the respective support rods 22 engage with the upper surface of the base 12 so as to release the intermediate mold 27 from being pressed by the springs 19, the wheels 26a and 26b of the lower mold 26 return to their initial positions where the wheels 26a and 26b are supported by the respective support rails 18a and 18b, so that, in the same manner as in the case of operation of insertion of the mold 25, the lower and upper molds 26 and 28 are prevented from being excessively heated by the corresponding first and second plates 10 and 16 respectively. On the other hand, in the upper press 2, the ram 4 comes up and the mold 25 is immediately released from being pressed by the press 2. Next, after the intermediate mold 27 is released from being pressed by the springs 21, the wheels 26a and 26b of the lower mold 26 return to their initial positions where the wheels 26a and 26b are supported by the respective support rails 20a and 20b, so that the lower and upper molds 26 and 28 are prevented from being excessively heated by the corresponding first and second plates 11, 17.

The pair of molds 25 and 25 released from being pressed and heated are automatically horizontally extracted at the same time. This extraction is performed by means of the pairs of wheels 26a and 26b of the respective lower molds 26 rolling on the respective pairs of support rails 18a and 18b, and 20a and 20b, so that the respective molds 25 are prevented from damaging the first and second heat plates 10 and 16, and 11 and 17, respectively. The pair of heat-formed disc pads constituted by the back plate 30 and the friction material 31 are extracted from the respective presses 1 and 2 and supplied to the next step, that is, a heating step in an oven.

Although a pair of molds 25 are interposed between a lower-placed pair of first and second heat plates 10 and 16 and between a lower-placed pair of first and second heat plates 11 and 17 respectively in the foregoing embodiment, the invention is applicable to a case in which a plurality of molds are inserted into each press. In the latter case, it is preferred that in each press, the molds 25 are arranged in a single stage in one and the same plane so as to equalize their heat histories received from the pair first and second plates 10 and 16 or 11 and 17.

As has been understood from the above description, according to the present invention, a pair of disc pads are heat-formed by a pair of presses disposed on a floor. Accordingly, it is possible to extremely improve the capability of producing disc pads, and it is also possible to obtain a conspicuous advantage in practical use in that an intermediate mold is urged in advance by springs against a back plate at the time of press-forming so that burr can be prevented from being produced during that time by means of a simple structure. In addition to the above advantages, by the provision of support members, the mold supplying/extracting operation can be made easy without damaging heat plates or without receiving exceeding heat from heat plates. Further, in the case of producing various disc pads, it is possible to shorten the time required to heat molds at the time of replacing molds by new molds if the new molds are heated in advance. Thus, the efficiency in the production of disc pad can be improved extremely.

What is claimed is:

1. A hot press for heat forming a disc pad comprising:
   a first press;
   a first ram movable in a pressing direction and a releasing direction, said first ram being attached to said first press;
   a first base;
   a support means for movably supporting said first ram and for fixedly supporting said first base;
   a first heat plate and a second heat plate interposed between said first ram and said first base;
   a first adiabatic member and a second adiabatic member, said first adiabatic member being attached to said first heat plate and said second adiabatic member being attached to said second heat plate, said first adiabatic member and said first heat plate being movable with said first ram, said second adiabatic member and said second heat plate being mounted to said first base;
   a first mold inserted between said first and second heat plates, said first mold including an upper mold having a pressing surface for contacting said first heat plate during movement of said first ram in said pressing direction, an intermediate mold, a lower mold, and a back plate, said back plate being mounted on said lower mold;
   a first set of support rods each having a first end; and
   first spring means for biasing said first set of support rods during movement of said first ram in said pressing direction such that said first end of each of said set of support rods engages said intermediate mold to press said intermediate mold against said back plate before said first heat plate contacts said upper mold of said first mold.

2. A hot press for heat forming a disc pad according to claim 1, further including a bolster, said bolster being interposed between said first ram and said first adiabatic member.

3. A hot press for heat forming a disc pad according to claim 1, further including a set of support member for supporting said lower mold and having means for forming predetermined distances between said upper mold and said first heat plate and between said lower mold and said second heat plate when said first ram moves in said releasing direction; and means for closing said predetermined distances by releasing said lower mold from being supported by said set of support members when said first ram moves in said pressing direction.

4. A hot press for heat forming a disc pad according to claim 1, further comprising:
   a second press;
   a second ram movable in a pressing direction and a releasing direction, said second ram being attached to said second press, and said second ram being movably supported by said support means;
   a second base, wherein said support means fixedly supports said second base;
   a third heat plate and a fourth heat plate interposed between said second ram and said second base;
   a third adiabatic member and a fourth adiabatic member, said third adiabatic member being attached to said third heat plate and said fourth adiabatic member being attached to said fourth heat plate, said fourth adiabatic member and said fourth heat plate being movable with said second ram, said third adiabatic member and said third heat plate being mounted on said second base;
   a second mold inserted between said third and fourth heat plates, said second mold including a second upper mold having a pressing surface for contacting said third heat plate during movement of said second ram in said pressing direction, a second intermediate mold, a second back plate, and a second lower mold, said second back plate being mounted on said second lower mold;
   a second set of support rods each having a first end; and second spring means for biasing said second set of support rods during movement of said second ram in said pressing direction such that said first end of each of said second set of support rods engages said second intermediate mold to press said second intermediate mold against said second back plate before said third heat plate contacts said second upper mold of said second mold.

5. A hot press for heat forming a disc pad according to claim 4, further including a second bolster, said second bolster being interposed between said second ram and said fourth adiabatic member.

6. A hot press for heat forming a disc pad according to claim 4, further including a second set of support members for supporting said second lower mold and having means for forming predetermined distances between said second upper mold and said third heat plate and between said lower mold and said fourth heat plate when said second ram moves in said releasing direction; and means for closing said predetermined distances by releasing said second lower mold from being supported by said second set of support members when said second ram moves in said pressing direction.

7. A hot press for heat forming a disc pad according to claim 1, wherein said upper mold is fitted into said intermediate mold, and wherein a friction material is inserted in said intermediate mold.

8. A hot press for heat forming a disc pad according to claim 1, wherein said intermediate mold is mounted on said back plate.

9. A hot press for heat forming a disc pad according to claim 4, wherein said second upper mold is fitted into said second intermediate mold, and wherein a friction material is inserted in said second intermediate mold.

10. A hot press for heat forming a disc pad according to claim 4, wherein said second intermediate mold is mounted on said second back plate.

11. A hot press for heat forming a disc pad according to claim 1, wherein said lower mold includes wheels to provide motion for said first mold.

12. A hot press for heat forming a disc pad according to claim 4, wherein said second lower mold includes wheels to provide motion for said second mold.

13. A hot press for heat forming a disc pad according to claim 2, wherein said first spring means has four springs provided at each corner of said bolster.

14. A hot press for heat forming a disc pad according to claim 4, wherein said second spring means has four springs provided at each corner of said second base.

15. A hot press for heat forming a disc pad according to claim 1, wherein said first spring means includes a set of springs attached to said first set of support rods for forcing a predetermined space between said first ends of each of said first set of support rods and said intermediate mold when said first ram moves in said releasing direction.

16. A hot press for heat forming a disc pad according to claim 1, wherein said support means includes a first support and a second support, said first support being connected to one side of said first press and second support means connected to another side of said first press.

17. A hot press for heat forming a disc pad according to claim 16, wherein said first base is fixed onto a portion of said first and second supports.

18. A hot press for heat forming a disc pad according to claim 4, wherein said second spring means includes a second set of springs attached to said second set of support rods for forcing a predetermined space between said first ends of each of said second set of support rods and said second intermediate mold when said second ram moves in said releasing direction.

19. A hot press for heat forming a disc pad according to claim 4, wherein said support means includes a first support and a second support, said first support being connected to one side of said second press and said second support being connected to another side of said second press.

20. A hot press for heat forming a disc pad according to claim 19, wherein said second base is fixed onto a portion of said first and second supports.

21. A hot press for heat forming a disc pad according to claim 4, wherein said first and second presses are arranged in opposition to each other and coupled together by said support means.

* * * * *

UNITED STATES PATENT AND TRADEMARK OFFICE
CERTIFICATE OF CORRECTION

PATENT NO. : 5,073,099

DATED : December 17, 1991

INVENTOR(S) : KATSUNARI KAYANO

It is certified that error appears in the above-identified patent and that said Letters Patent is hereby corrected as shown below:

Claim 1, column 8, line 22, before "set" insert --first--.

Claim 3, column 8, line 31, change "member" to --members--.

Claim 6, column 9, line 18, before "lower" insert --second--.

Claim 16, column 10, line 17, before "second" insert --said--.

Claim 16, column 10, line 18, change "means" to --being--.

Signed and Sealed this

Fifteenth Day of June, 1993

*Attest:*

MICHAEL K. KIRK

*Attesting Officer*  Acting Commissioner of Patents and Trademarks